United States Patent
Ninomiya et al.

(10) Patent No.: US 6,723,146 B2
(45) Date of Patent: Apr. 20, 2004

(54) BLOWER APPARATUS FOR VEHICLE

(75) Inventors: Hitoshi Ninomiya, Kariya (JP); Yukitaka Abe, Hekinan (JP); Shinji Iwama, Nagoya (JP); Kazutoshi Nishizawa, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/212,391

(22) Filed: Aug. 5, 2002

(65) Prior Publication Data
US 2003/0029319 A1 Feb. 13, 2003

(30) Foreign Application Priority Data

Aug. 10, 2001 (JP) ........................ 2001-244215
Dec. 18, 2001 (JP) ........................ 2001-384830

(51) Int. Cl.[7] .............................................. B03C 3/011
(52) U.S. Cl. ................. 55/344; 55/350.1; 55/385.3; 55/471; 96/18; 96/58; 96/63; 96/94; 96/222; 454/158
(58) Field of Search ................. 96/18, 55–58, 96/63, 94, 222; 55/385.1, 344, 471, 350.1, 385.3; 454/156–161

(56) References Cited

U.S. PATENT DOCUMENTS

| 4,376,642 | A | * | 3/1983 | Verity | ............................. 96/58 |
| 4,629,479 | A | * | 12/1986 | Cantoni | ..................... 55/471 X |
| 4,743,406 | A | | 5/1988 | Steiner et al. | ................. 261/30 |
| 4,849,862 | A | * | 7/1989 | Diskin et al. | .............. 55/471 X |
| 4,921,509 | A | * | 5/1990 | Maclin | ........................... 96/57 |
| 5,139,546 | A | * | 8/1992 | Novobilski | |
| 5,395,410 | A | * | 3/1995 | Jang | .............................. 55/471 |
| 5,454,859 | A | * | 10/1995 | Chiba et al. | ........... 55/385.3 X |
| 5,456,742 | A | * | 10/1995 | Glenn et al. | ................. 96/63 X |
| 5,562,407 | A | * | 10/1996 | Cielo | ......................... 55/471 X |
| 5,578,113 | A | * | 11/1996 | Glenn | ......................... 96/57 X |
| 5,702,507 | A | * | 12/1997 | Wang | ............................ 96/55 |
| 5,707,429 | A | * | 1/1998 | Lewis | .............................. 96/63 |
| 5,865,880 | A | * | 2/1999 | Matsui | ....................... 96/58 X |
| 6,071,479 | A | * | 6/2000 | Marra et al. | .............. 55/471 X |
| 6,322,614 | B1 | * | 11/2001 | Tillmans | ..................... 96/63 X |
| 6,355,095 | B1 | * | 3/2002 | Kuo-Long | .................. 96/58 X |
| 6,428,611 | B1 | * | 8/2002 | Andolino et al. | ........... 96/63 X |
| 6,471,752 | B1 | * | 10/2002 | Lewis | ........................ 96/63 X |
| 6,641,636 | B2 | * | 11/2003 | Willig et al. | ................ 55/385.3 |

* cited by examiner

Primary Examiner—Richard L. Chiesa
(74) Attorney, Agent, or Firm—Harness, Dickey & Pierce, PLC

(57) ABSTRACT

A blower apparatus for a vehicle for blowing air into a cabin. The blower apparatus including a case member, various units and airflow passages. The units include an air cleaning unit for cleaning the air, and a component-adding unit for adding air components such as ions to the air. The units have compatible external shapes and sizes for selective installation in almost the same positions in the airflow passages, thereby meeting user needs of changing the function of the blower apparatus simply by arranging the units to the desired positions.

10 Claims, 12 Drawing Sheets

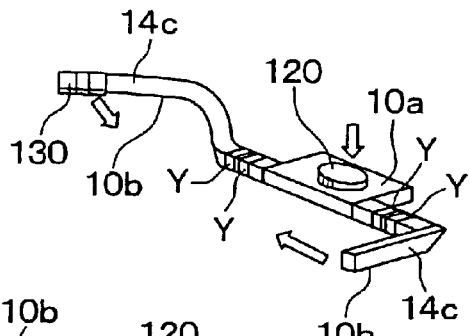
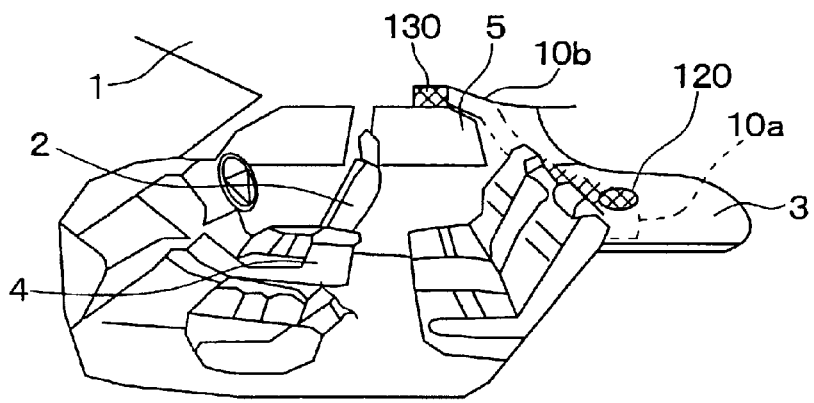
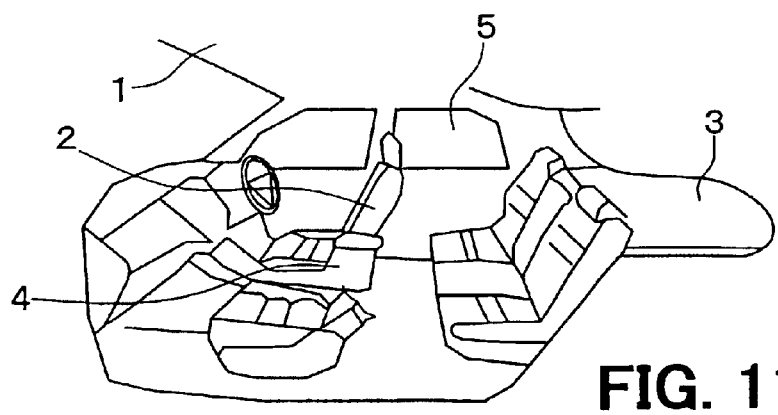
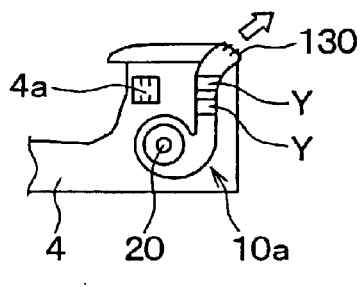

FIG. 14

| SMOKE SENSOR OUTPUT | | | VOLTAGE AT POINT C | VOLTAGE AT POINT D | MOTOR OPERATION |
|---|---|---|---|---|---|
| EQUAL TO OR LESS THAN 1.5V | 1.5V TO 3.5V | EQUAL TO OR MORE THAN 3.5V | | | |
| — | — | — | LO | LO | OFF |
| — | — | — | HI | LO | LO |
| — | — | — | LO | HI | HI |
| (SMOKE DENSITY: LOW) | | | HI | HI | OFF |
| | (SMOKE DENSITY: MEDIUM) | | | | LO |
| | | (SMOKE DENSITY: HIGH) | | | HI |

BLOWER APPARATUS FOR VEHICLE

CROSS REFERENCE TO RELATED APPLICATIONS

This application is based upon, claims the benefit of priority of, and incorporates by reference the contents of prior Japanese Patent Applications No. 2001-244215 filed Aug. 10, 2001, and No. 2001-384830 filed Dec. 18, 2001.

BACKGROUND OF THE INVENTION

1. Field of the Invention

The present invention relates to a blower apparatus for blowing air into a vehicle interior.

2. Description of Related Art

A blower apparatus including an air cleaning unit for cleaning air, and a blower apparatus including a component-adding unit for adding air components such as negative ions and aroma are known.

However, since these blower apparatuses are designed independently, a component-adding unit, for example, cannot be installed at a position where the air cleaning unit is uninstalled. As a result, if a user who uses a vehicle installed with a blower apparatus with an air cleaning unit wants to change to a blower apparatus with a component-adding unit, the user has to replace the entire blower apparatus.

SUMMARY OF THE INVENTION

The present invention was devised in view of the foregoing, and an object is to provide a blower apparatus which can change or adapt to different functions without requiring replacement of the entire blower apparatus when a user desires such a change.

To attain the above object, in a first aspect of the present invention, a blower apparatus for a vehicle includes a case member for forming an airflow passage inside, a blower for blowing air into an automobile cabin through the airflow passage, an air cleaning unit for cleaning the air, and a component-adding unit for adding an air component. The air cleaning unit and the component-adding unit are selectively installed at almost the same position in the airflow passage.

With this arrangement, when the user wants to change the function, the user can do so by simply replacing the unit, thereby continuing to use the blower apparatus, resulting in a reduced cost for the user.

In a second aspect of the present invention, a blower apparatus for a vehicle includes a case member for forming an airflow passage inside, a blower for blowing air into a vehicle cabin through the airflow passage, two or more types of units having different functions, and selectively installed at approximately the same positions in the airflow passage, and power supply means for supplying the unit with electrical power. Installing the unit within the case member electrically connects the unit with the power supply means.

Also, with this constitution, when the user wants to change the function of the apparatus, the user can do so by simply replacing the unit, thereby continuing to use the blower apparatus in a way different from the first unit, resulting in a reduced cost imposed on the user. In addition, since the power supply means is provided in advance, it is not necessary to provide another power supply for a unit requiring a power supply when the unit is to be replaced, thereby realizing simple and easy replacement of the unit.

In a third aspect of the present invention, the power supply means is composed of power supply electrodes fixed on an inner wall surface of the case member. The unit is provided with electrodes to be connected with the power supply electrodes. The unit is installed in the case member to facilitate electrical connection of the electrodes of the units with the power supply electrodes. With this constitution, simply installing the units in the case member completes the connection with the power supply circuit, thereby realizing a simple and easy change for the units.

In addition, since the power supply means is the electrodes fixed on the inner wall surface of the case member, a pressure loss can be reduced compared with a case where connectors are used with the power supply means, and the connectors are provided in the airflow passage, for example.

In a fourth aspect of the present invention, the power supply electrodes having a plate shape are provided along the inner wall surface of the case member. With this constitution, the pressure loss can be reduced further.

In a fifth aspect of the present invention, the blower includes a fan and a motor for driving the fan, and the blower apparatus includes fan control means for controlling operation of the motor, and simultaneously controlling power supply for the unit. With this constitution, since the fan control means has a function for controlling the power supply for the unit, it is not necessary to provide another controller for the unit requiring a power supply control when the unit is to be replaced, thereby realizing a simple and easy replacement of the unit.

In a sixth aspect of the present invention, the unit is provided with unit control means for controlling operation of the unit. With this constitution, the unit includes the unit control means, thereby realizing a simple and easy replacement of the units compared with a case where the unit control means is provided independently of the unit.

In a seventh aspect of the present invention, a scroll portion is formed in the case member, the fan is provided in the scroll portion, and the fan control means is provided in an outside space of a nose portion of the scroll portion. With this constitution, the outside space of the nose portion, which is usually a dead space, is used efficiently, thereby reducing the size of the apparatus.

In an eighth aspect of the present invention, a unit power supply wire for supplying the unit with electric power, branches from fan control means for controlling the power supply for the blower motor, thereby supplying the unit with electric power.

In a ninth aspect of the present invention, a plurality of connectors detachable from the unit are connected with the unit power supply wire, and the plurality of connectors have an identical connector shape and an identical terminal arrangement. With this constitution, since the multiple connectors have the identical connector shape and the identical terminal arrangement, a connection error is unlikely. In addition, any connector can be connected with any unit when multiple units which require a power supply and have different functions are used.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 10A is an explanatory drawing showing a third embodiment of the present invention;

FIG. 10B is an explanatory drawing showing a third embodiment of the present invention;

FIG. 11A is an explanatory drawing showing a fourth embodiment of the present invention;

FIG. 11B is an explanatory drawing showing a fourth embodiment of the present invention;

FIG. 14 is a table describing an operation of a drive logic circuit in FIG. 13;

DETAILED DESCRIPTION OF THE PREFERRED EMBODIMENTS

The following description of the preferred embodiment(s) is merely exemplary in nature and is in no way intended to limit the invention, its application, or uses.

(First Embodiment)

Figure 1:
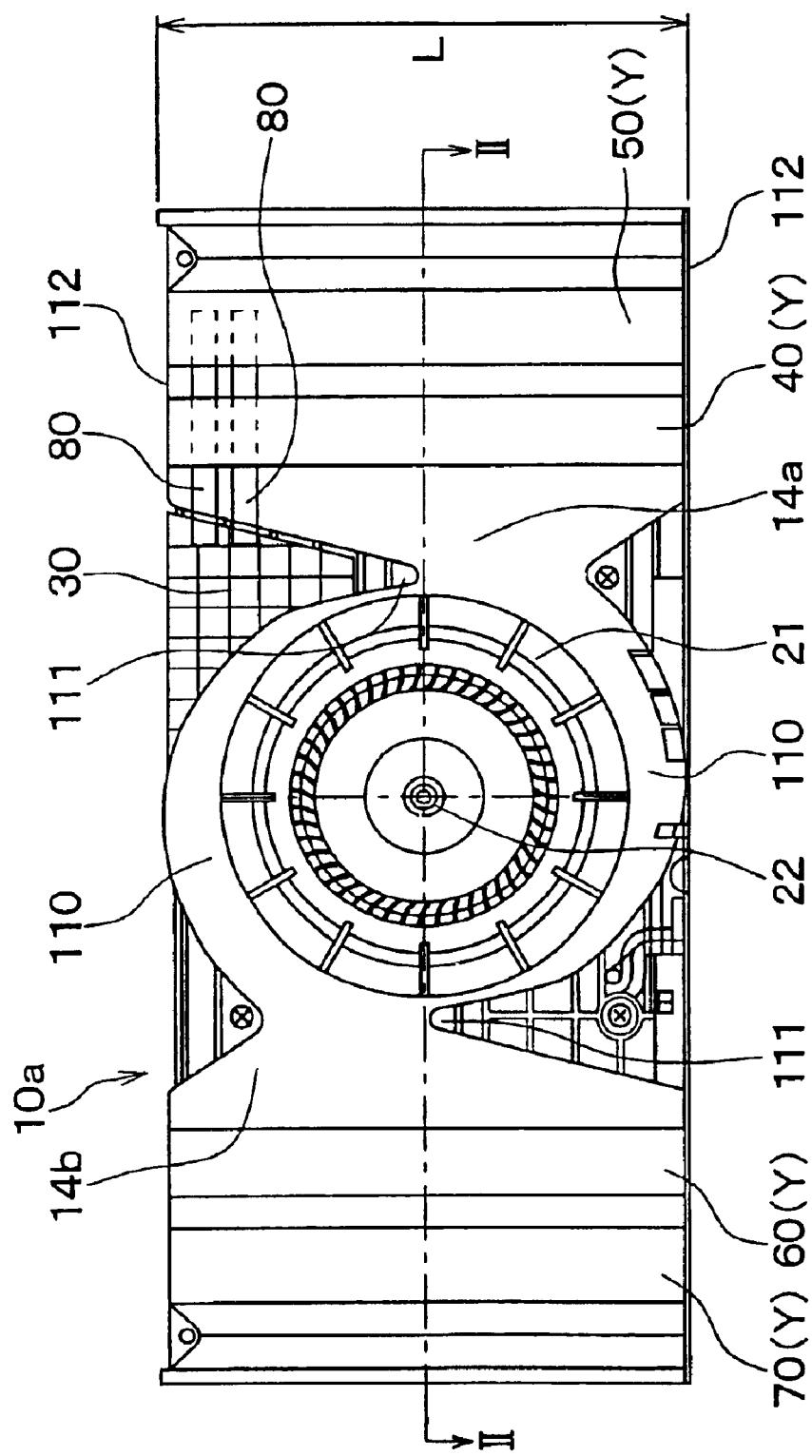
FIG. 1 is a cross-sectional view showing a blower apparatus according to a first embodiment of the present invention.
Figure 2:
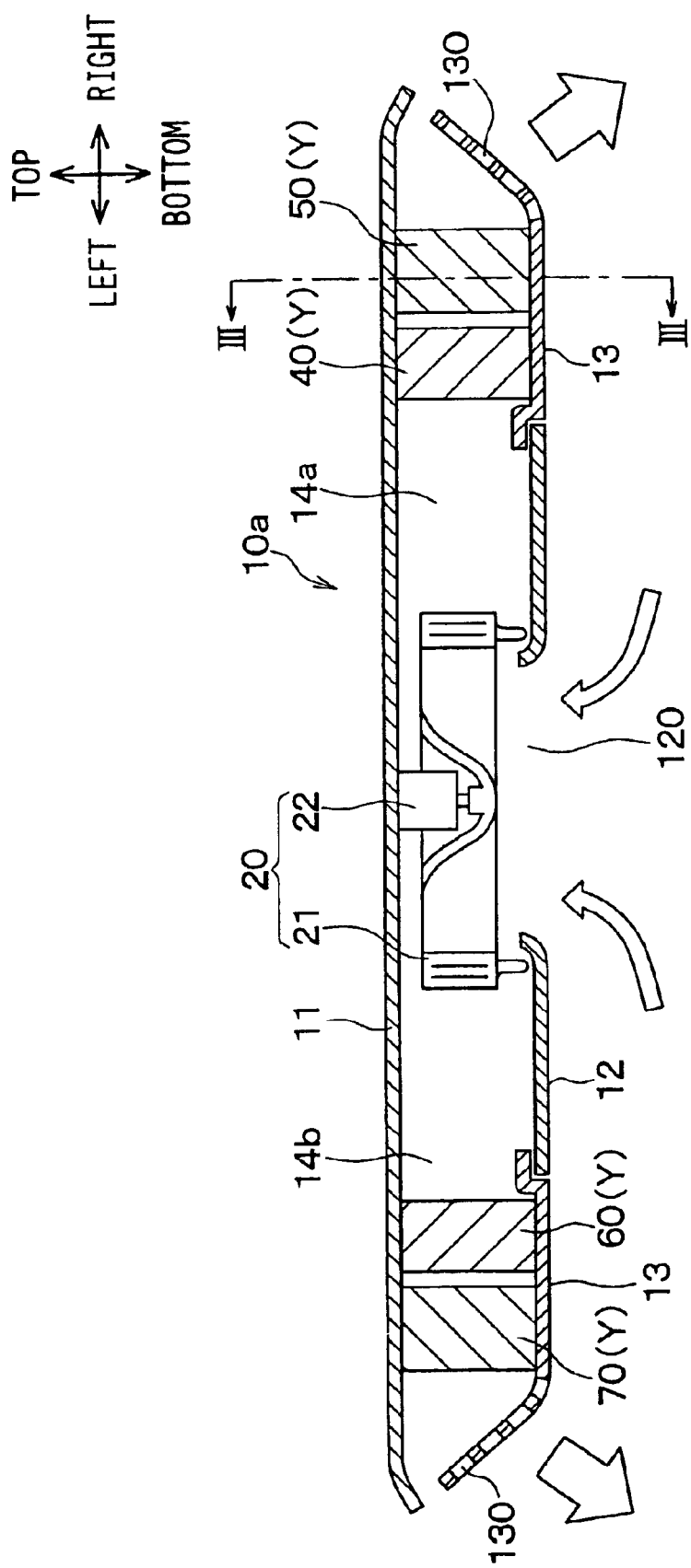
FIG. 2 is a cross-sectional view taken along line II—II in FIG. 1.
Figure 3:
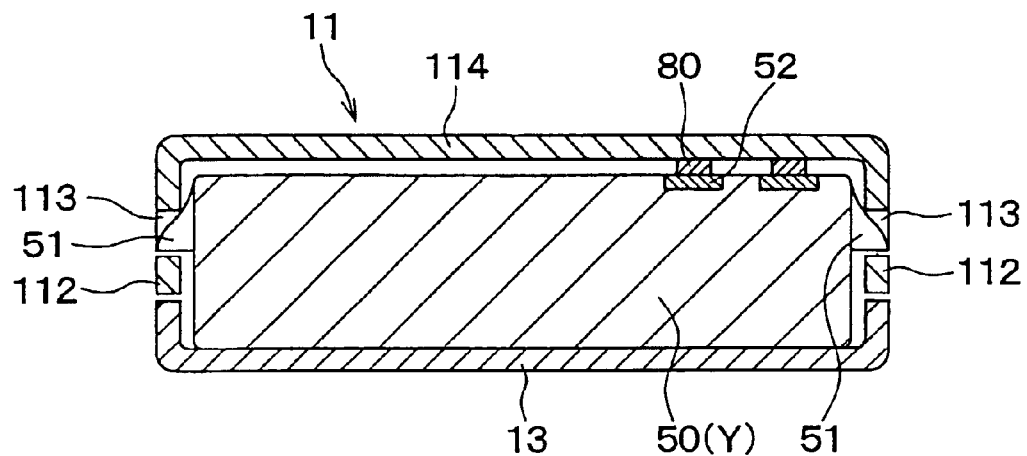
FIG. 3 is a cross-sectional view taken along the line III—III in FIG. 2.

FIG. 1 to FIG. 7 show a first embodiment of the present invention. FIG. 1 is a cross-sectional view of a blower apparatus. FIG. 2 is a cross-sectional view taken along line II—II in FIG. 1. FIG. 3 is a cross-sectional view taken along the line III—III in FIG. 2.

Figure 8:
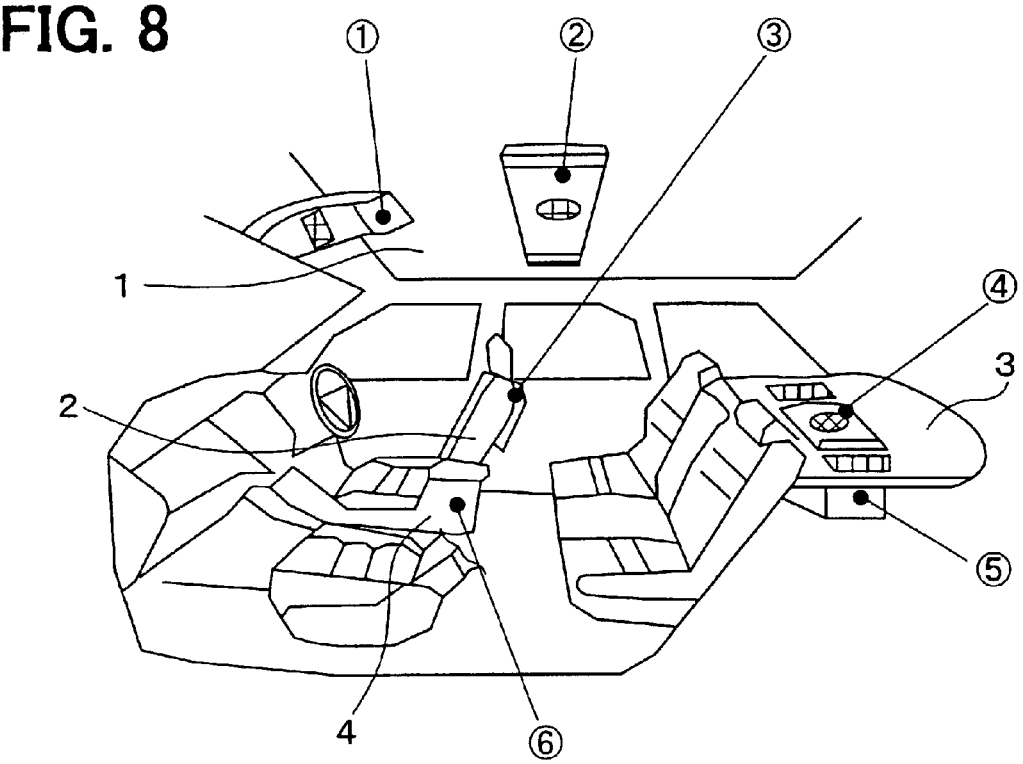
FIG. 8 is a perspective view showing installation positions of a blower apparatus in a cabin.

The blower apparatus can be installed at any one of the positions indicated by the reference symbols (1) to (6) in FIG. 8. A front part on a ceiling of a vehicle 1 in the front/rear direction of the vehicle is indicated by the reference symbol (1). Almost a center part on the ceiling 1 in the front/rear direction of the vehicle is indicated by the reference symbol (2). A rear surface of a driver's seat 2 in the front/rear direction of the vehicle is indicated by the reference symbol (3). A top surface of an upper back panel 3 is indicated by the reference symbol (4). A bottom surface of the upper back panel 3 is indicated by the reference symbol (5). The inside of a console box 4 is indicated by the reference symbol (6).

The blower apparatus of the present embodiment is installed at the position indicated by the reference symbol (2) in FIG. 8. As shown in FIG. 1 to FIG. 3, a main body case 10a (serving as a case member) includes a top case 11, a bottom case 12, and a cover 13. A first airflow passage 14a extending from the installation position of a blower 20 toward the right of the vehicle, and a second airflow passage 14b extending toward the left of the vehicle are formed in the main body case member 10a.

Cases 11 and 12 and the cover 13 are made of resin such as ABS resin which provides sufficient mechanical strength and flexibility. Both of the cases 11 and 12 are fastened with fasteners such as screws. The cover 13 is detachable from both the cases 11 and 12. When the cover 13 is used, the cover 13 is engaged with both of the cases 11 and 12.

The blower 20 includes a fan 21 and a motor 22. The blower 20 is placed in a scroll portion 110 formed in the top case 11 at a position corresponding to an inlet port 120 formed in the bottom case 12. This fan 21 is a centrifugal fan drawing air along the longitudinal direction of the rotational shaft, and blowing air outward in the radial direction with respect to the shaft. The fan 21 is driven to rotate by the motor 22. Thus, the blower 20 draws air in the cabin from the inlet port 120, and blows air into the cabin from two outlet ports 130 formed on the cover 13 through the scroll portion 110 and both the airflow passages 14a and 14b.

An vehicle power supply (not shown) provides a fan control circuit 30 (serving as fan control means) with electric power. The fan control circuit 30 controls a power supply for the motor 22, thereby setting the start/stop and the rotation speed of the motor 22 based on a signal from an unillustrated main switch for manually setting the start/stop of the blower apparatus. The fan control circuit 30 also includes a function for controlling a power supply for an ion generator 50, to be described later. The fan control circuit 30 is installed in an outside space of a nose 111, which is a start point of the scroll portion 110.

A dust filter 40 collecting dust in the air with an unwoven cloth, for example, is placed in the first airflow passage 14a. The ion generator 50 for adding negative ions to the air is placed on the downstream side of the dust filter 40 in the first airflow passage 14a. An ion generator which emits electrons to form plasma for deodorizing and sterilizing may be used as the ion generator 50.

A deodorizing filter 60 is placed in the second airflow passage 14b. The deodorizing filter 60 uses activated carbon attached to an elastically deformable honeycomb carrier to remove odors in the air, thereby cleaning the air. An aroma generator 70 containing aroma components such as aroma agents and aroma oil is placed on the downstream side of the deodorizing filter 60 in the second airflow passage 14b.

The dust filter 40 and the deodorizing filter 60 serve as an air cleaning unit which cleans the air. The ion generator 50 and the aroma generator 70 serve as a component-adding unit which adds components (such as negative ions and aroma) to the air. Both the filters 40 and 60, and both the generators 50 and 70 are generally referred to as a unit Y in the following section.

Figure 4:
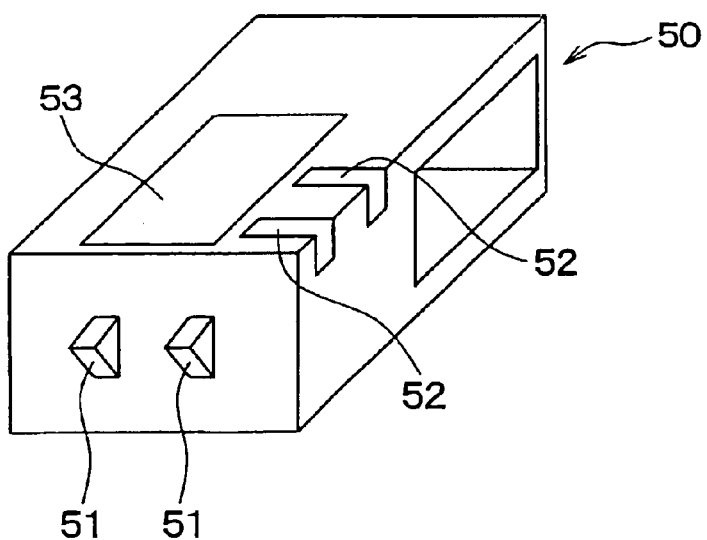
FIG. 4 is a perspective view of a component adding unit such as an ion generator in FIG. 1.

FIG. 4 shows the ion generator 50. The exterior of the ion generator 50 is a rectangular parallelepiped (box). Protruding pawls 51 are formed on both end surfaces in the lengthwise direction of the ion generator 50. Two electrodes 52 are formed on one end (side) surface in the thickness direction. The ion generator 50 stores an unillustrated ion generating part for electrically generating negative ions, and a unit control circuit 53 (serving as unit control means) controls the operation of the ion generating part.

The exterior of the aroma generator 70 is a rectangular parallelepiped (box) as the ion generator 50 shown in FIG. 4. Protruding pawls are formed on both end surfaces in the lengthwise direction. The ion generator 50 and the aroma generator 70 are the same in the external dimension, as are the size and the positions of the pawls 51.

Figure 5:
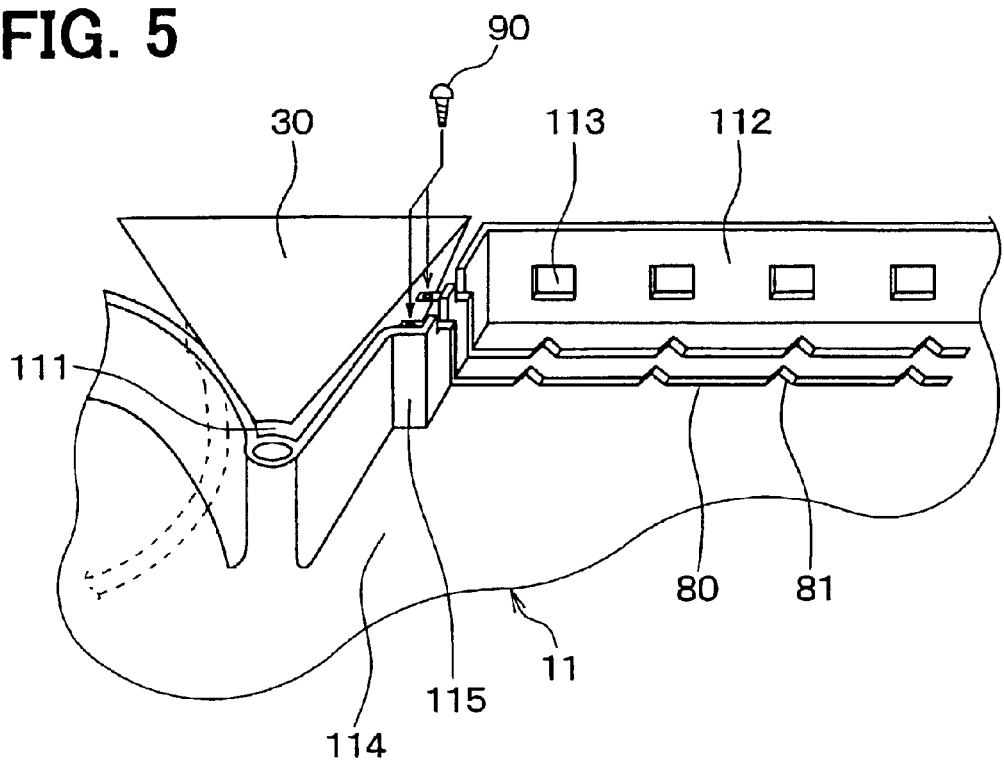
FIG. 5 is a perspective view of a part where units are installed in FIG. 1.

FIG. 5 shows a structure of a part where the dust filter 40 (FIG. 2) and the ion generator 50 are installed in the first airflow passage 14*a*. Holes 113 are formed on both wall surfaces 112 of the top case 11. The pawls 51 of the ion generator 50 are engaged with these holes 113, thereby fixing the ion generator 50 to the top case 11 as shown in FIG. 3.

Holes (not shown) are also formed on both wall surfaces of the second flow passage 14*b* of the top case 11. The pawls of the aroma generator 70 are engaged with these holes, thereby fixing the aroma generator 70 to the top case 11.

The dust filter 40 and the deodorizing filter 60 have a rectangular parallelepiped exterior, and are almost as large as both of the generators 50 and 70. However, both the filters 40 and 60 are slightly longer in the lengthwise direction than a length L (see FIG. 1) between both the wall surfaces 112 of the top case 11. Thus, both the filters 40 and 60 are pressed and deformed in the lengthwise direction to insert between both the wall surfaces 112 of the top case 11, thereby fixing both the filters 40 and 60 to the top case 11 using their own elastic forces.

As described above, all the units Y have a rectangular parallelepiped shape, and are almost the same size. Namely, the units Y have a compatible external shape and size for switching their installation positions. The unit Y can be installed and uninstalled while the cover 13 is removed from the cases 11 and 12.

Figure 6:
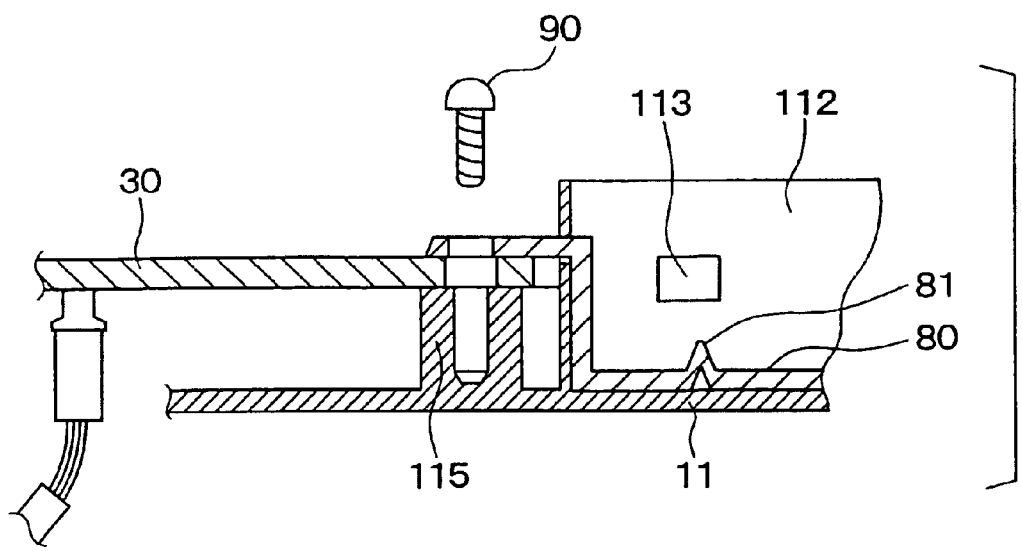
FIG. 6 is a cross-sectional view showing an installation structure for an electrode in FIG. 5.
Figure 7:
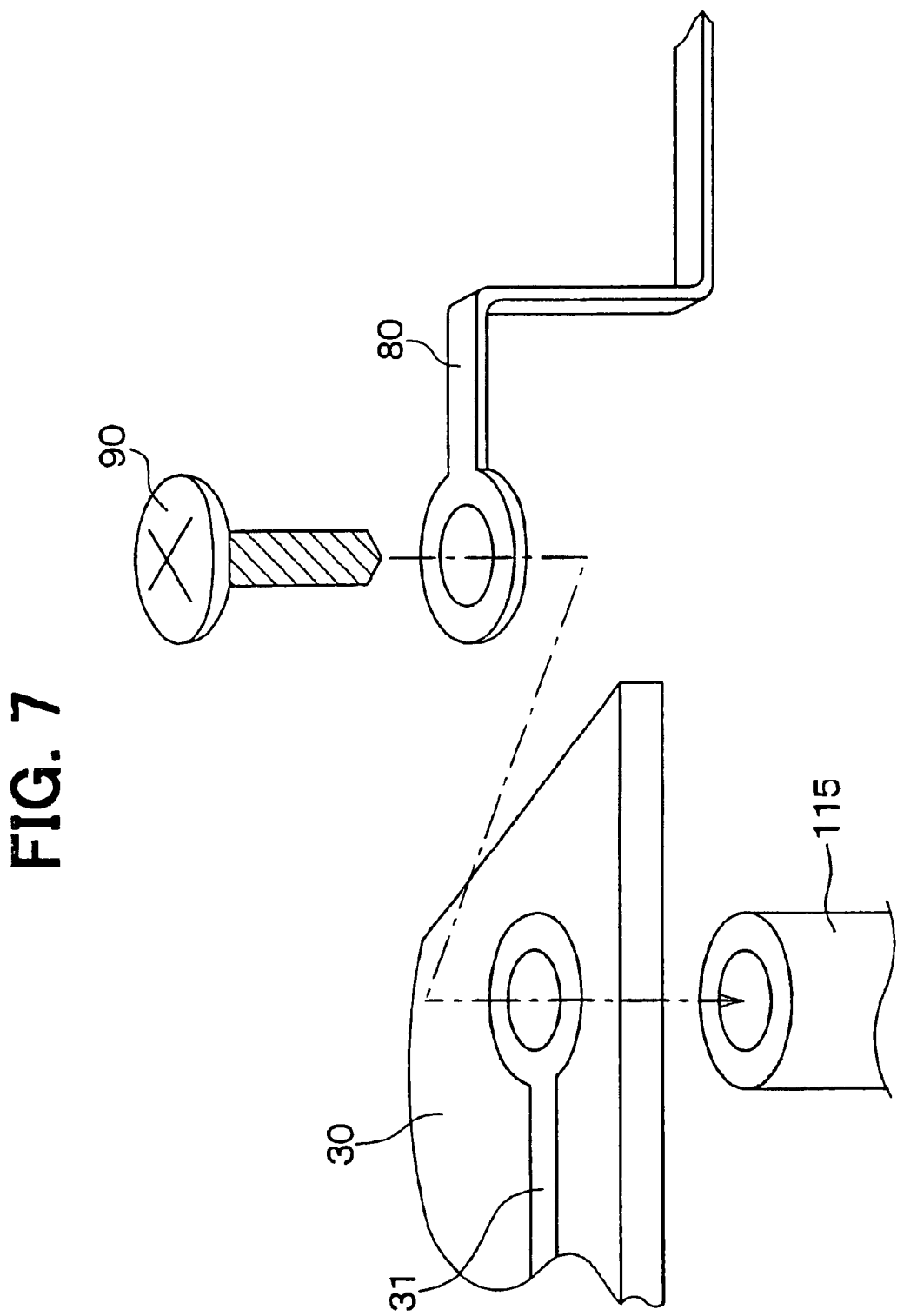
FIG. 7 is an exploded perspective view showing the installation structure for the electrode in FIG. 5.

As shown in FIG. 5, two plate-shaped electrodes 80 (serving as power supply means) are provided along a top wall surface 114 of the top case 11. The electrodes 80 are made of an elastically deformable copper plate. A proper number of protrusions 81 are formed on the electrodes 80. The electrodes 80 along with the fan control circuit 30 are fixed to bosses 115 on the top case 11 with screws 90, thereby electrically connecting the electrodes 80 with patterns 31 on the fan control circuit 30 as shown in FIG. 6 and FIG. 7.

When the ion generator 50 is installed in the top case 11, the electrodes 52 of the ion generator 50 come in contact with the protrusions 81 of the electrodes 80 of the top case 11, thereby supplying the ion generator 50 with electric power from the vehicle power supply. In this state, a restoring force of the protrusions 81, which are elastically deformed, secures a contact pressure between the electrodes 52 of the ion generator 50 and the electrodes 80 of the top case 11. Since the restoring force of the protrusions 81 energizes the ion generator 50 downward in FIG. 3, the pawls 51 of the ion generator 50 are pressed against a bottom inner peripheral surface in the holes 113 on the top case 11, thereby preventing a backlash of the ion generator 50.

The following section describes the blower apparatus having the constitution described above. When the main switch of the blower apparatus is turned on, the motor 22 is supplied with electric power, thereby driving the fan 21 to rotate, and simultaneously, the ion generator 50 is supplied with electric power. As the fan 21 rotates, the air in the cabin is drawn from the inlet port 120, and is blown out into the cabin from the two outlet ports 130.

The dust filter 40 catches dust in the air flowing through the first airflow passage 14*a*. Then, the ion generator 50 adds negative ions to the air. On the other hand, the deodorizing filter 60 removes odor from the air flowing through the second airflow passage 14*b*. Then, the aroma generator 70 adds aroma to the air.

When the dust filter 40, the deodorizing filter 60, the ion generator 50, and the aroma generator 70 are installed on the blower apparatus as in the present embodiment, the blower apparatus provides a dust removing function, a deodorizing function, a negative ion adding function, and an aromatizing function. Then, when a user wants to change the functions of the blower apparatus, the user can do so by following a procedure described below. The description below assumes that the function is changed from the exemplified state of the present embodiment.

(1) When the user wants to remove the negative ion adding function, and wants to increase the aromatizing function, for example, the user removes the ion generator 50, and then, installs an additional aroma generator 70 in the position where the ion generator 50 was situated. As a result, the aroma generators 70 are installed in the first airflow passage 14*a* and the second airflow passage 14*b*, thereby enhancing the aroma adding function.

(2) When the user wants to enhance the negative ion adding function, the user removes the dust filter 40, and then, installs an additional ion generator 50 in the position where the dust filter 40 was situated. As a result, the two ion generators 50 are installed in the first airflow passage 14*a*, thereby enhancing the negative ion adding function.

In this case, simply installing the additional ion generator 50 in the top case 11 brings the electrodes 52 in contact with the protrusions 81 of the electrodes 80 of the top case 11, thereby supplying the generator 50 with electric power from the vehicle power supply.

(3) When the user wants to enhance the dust removing function and the deodorizing function, the user removes the ion generator 50, and then, installs an additional deodorizing filter 60 in the position where the ion generator 50 was situated. Simultaneously, the user removes the aroma generator 70, and then, installs an additional dust filter 40 in the position where the aroma generator 70 was situated. As a result, both of the filters 40 and 60 are respectively installed in the first airflow passage 14*a* and the second airflow passage 14*b*, thereby enhancing the dust removing function and the deodorizing function.

In the present embodiment, since the unit Y has a compatible external shape and size for switching installed positions, when the user wants to change the functions of the blower apparatus, the user can do so by simply changing the units Y. Thus, the user continues to use the part of the blower apparatus other than the units Y, thereby reducing costs imposed on the user.

Also, since the electrodes 80 are provided as the power supply means for the blower apparatus in advance, it is not necessary to provide additional power supply means for the additional unit Y which may require a power supply when changing the unit Y (the ion generator 50 in the present embodiment).

Additionally, since the electrodes 80 are provided along the top wall surface 114 of the top case 11 as the power supply means, air blowing is not prevented. Thus, a decrease in airflow quantity caused by an increase of the pressure loss rarely occurs.

Further, since the fan control circuit 30 includes a function for controlling the power supply for the ion generator 50, it is not necessary to provide additional means for controlling the power supply for the ion generator 50 when the ion generator 50 is added.

Also, installing the ion generator 50 in the top case 11 completes the connection with the power supply circuit for the ion generator 50. Changing the unit is simple and easy. In addition, since the ion generator 50 includes the unit control circuit 53 for controlling the operation of the ion generating part, the operation for changing the unit is simple and easy compared with a case where the unit control circuit 53 is provided independently.

(Second Embodiment)

Figure 9B:
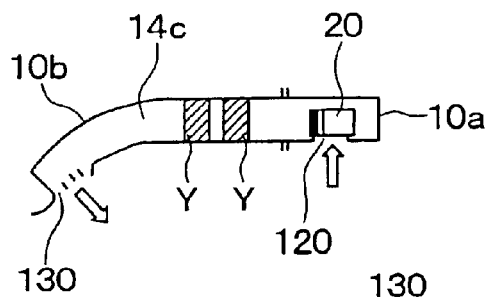
FIG. 9B is an explanatory drawing showing a second embodiment of the present invention.
Figure 9A:
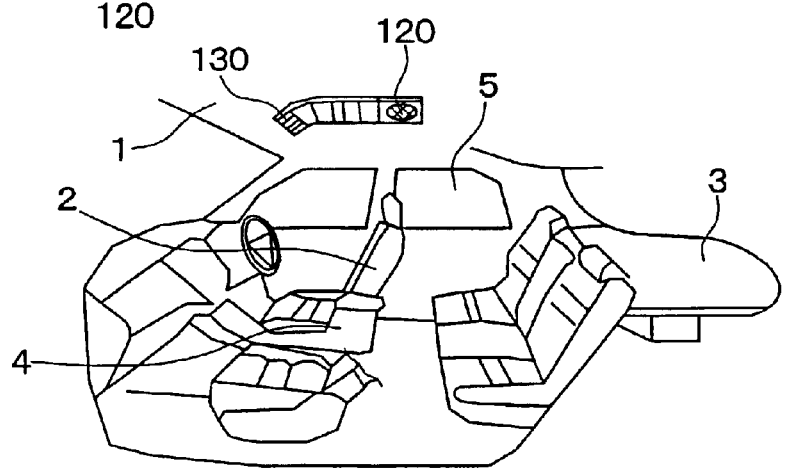
FIG. 9A is an explanatory drawing showing a second embodiment of the present invention.

FIGS. 9A and 9B show the constitution and installation position of a blower apparatus according to a second embodiment. Major differences of the present embodiment from the first embodiment include a blower apparatus that is installed on a front part in the front/rear direction of the vehicle on the ceiling 1, two units Y that are provided in a duct 10b separated from the blower 20, and a structure in which the air is blown out in one direction.

In the present embodiment, the case member in which an airflow passage is formed includes a main body case 10a and the duct 10b. The main body case 10a stores the blower 20 and the fan control circuit. The two units Y are provided in the airflow passage 14c of the single duct 10b.

Two electrodes similar to the electrodes 80 in the first embodiment are provided at positions where the units Y are provided in the duct 10b, thereby supplying the units Y with electrical power from the vehicle power supply. A detachable cover covers the part where the units Y are installed on the duct 10b for installing/uninstalling and replacing the units Y.

When the main switch of the blower apparatus is turned on, the blower 20 starts operating. Then, the blower 20 draws air in the cabin from an inlet port 120, and blows air into the cabin from an outlet port 130. The inlet port 120 and the outlet port 130 are formed in the duct 10b in the main body case 10a.

(Third Embodiment)

FIGS. 10A and 10B show the constitution and the installation position of a blower apparatus according to a third embodiment. Major differences of the present embodiment from the first embodiment include that the blower apparatus is installed on the bottom surface of the upper back panel 3 of the vehicle, the two units Y are installed in the individual two ducts 10b separated from the blower 20, and the air is blown out from the upper side of side window glass 5 next to the rear seats.

In the present embodiment, the case member in which airflow passages are formed includes the main body case 10a and the two ducts 10b. The main body case 10a stores the blower 20 and the fan control circuit. The two units Y are installed in the individual airflow passages 14c of the ducts 10b.

Two electrodes similar to the electrodes 80 in the first embodiment are provided at positions where the units Y are provided in the individual ducts 10b, thereby supplying the units Y with electric power from the vehicle power supply. A detachable cover covers the part where the units Y are installed on the individual ducts 10b for installing/uninstalling and replacing the units Y.

When the main switch of the blower apparatus is turned on, the blower 20 starts operating. As a result, the blower 20 draws air in the cabin from the inlet port 120, and blows air into the cabin from the outlet ports 130 formed on the ducts 10b. The air flows through the airflow passage in the main body case 10a, and the airflow passages in the ducts 10b.

(Fourth Embodiment)

FIGS. 11A and 11B show the constitution and the installation position of a blower apparatus according to a fourth embodiment. Major differences of the present embodiment from the first embodiment include that the blower apparatus is installed in the console box 4, and the air is blown out in one direction.

In the present embodiment, two units Y are provided in a single airflow passage formed in the main body case 10a. Two electrodes similar to the electrodes 80 in the first embodiment are provided at positions where the units Y are provided, thereby supplying the units Y with electrical power from the vehicle power supply. A detachable cover covers the part where the units Y are installed for installing/uninstalling and replacing the units Y.

When the main switch of the blower apparatus is turned on, the blower 20 starts operating. Then, the blower 20 draws the air in the cabin, introduced from an opening 4a of the console box 4, into the console box 4 from the inlet port 120, and blows air into the cabin from the outlet port 130 through the airflow passage in the main body case 10a.

(Fifth Embodiment)

Figure 12:
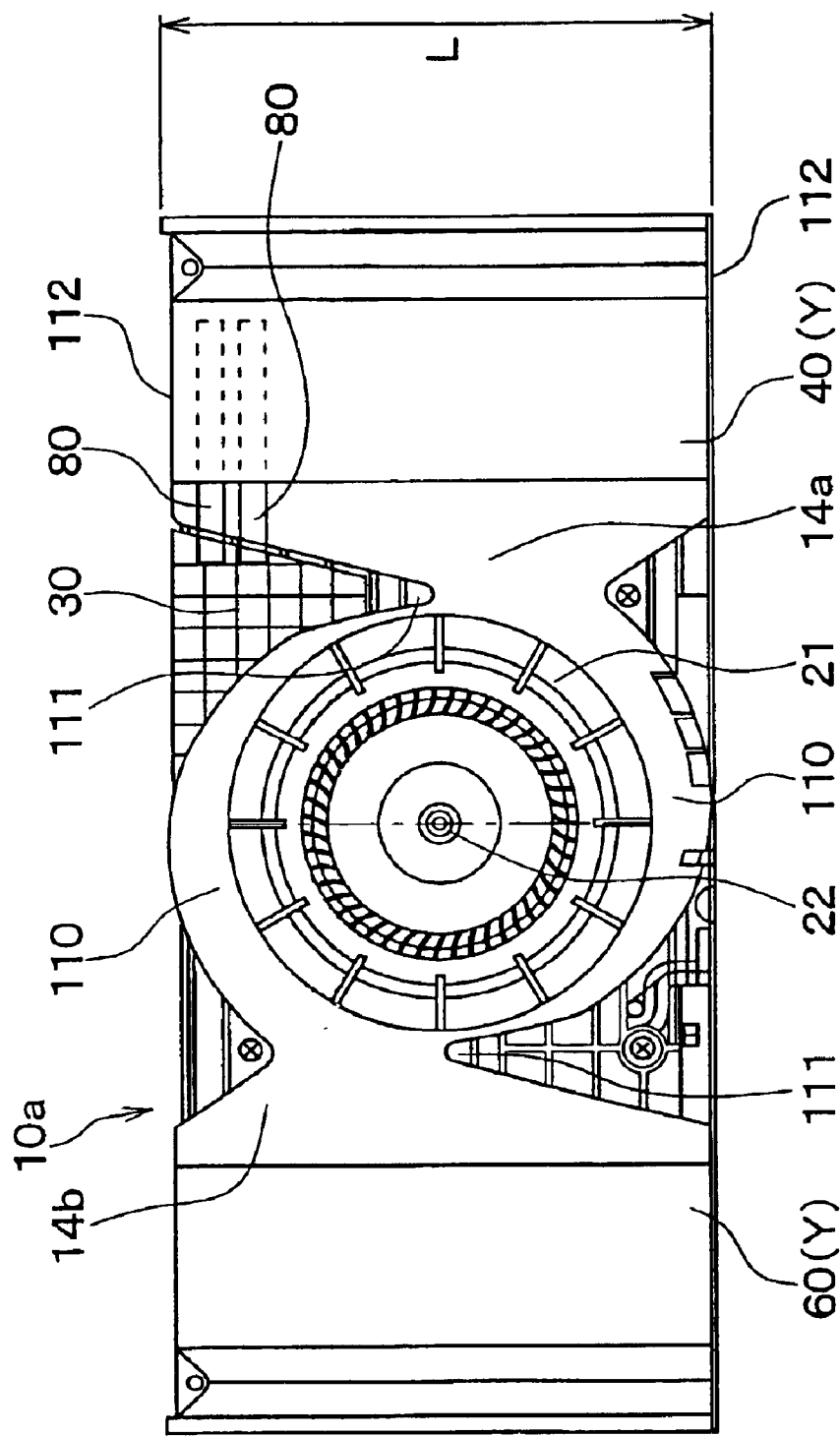
FIG. 12 is a cross-sectional view showing a blower apparatus according to a fifth embodiment of the present invention.

FIG. 12 shows the constitution of a blower apparatus according to a fifth embodiment. While the two units Y are installed in the individual airflow passages 14a and 14b in the first embodiment, a single unit Y is installed in each of the airflow passages 14a and 14b in the present embodiment.

The present embodiment shows an example where the dust filter 40 is installed in the first airflow passage 14a, and the deodorizing filter 60 is installed in the second airflow passage 14b. Since the individual units Y have a compatible external shape and size for switching their installation positions, either one of the dust filter 40 and the deodorizing filter 60 can be replaced with either one of the ion generator 50 or the aroma generator 70, or both the dust filter 40 and the deodorizing filter 60 can be replaced with a single functioning unit such as either the ion generator 50 or the aroma generator 70, for example, thereby changing the function of the blower apparatus to a dedicated task (ion generation or aroma generation).

(Sixth Embodiment)

Figure 13:
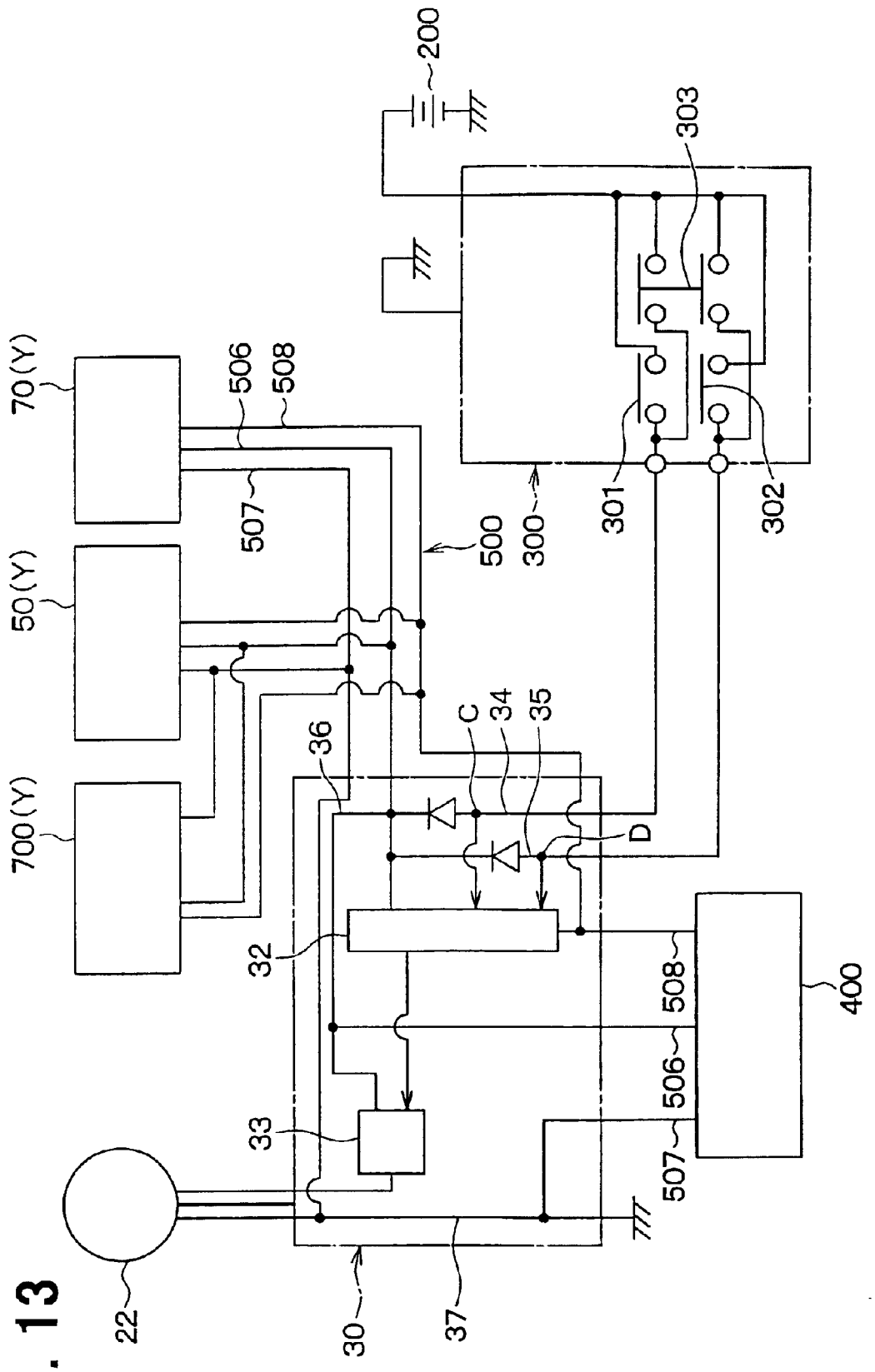
FIG. 13 is a circuit diagram showing a sixth embodiment of the present invention.
Figure 15:
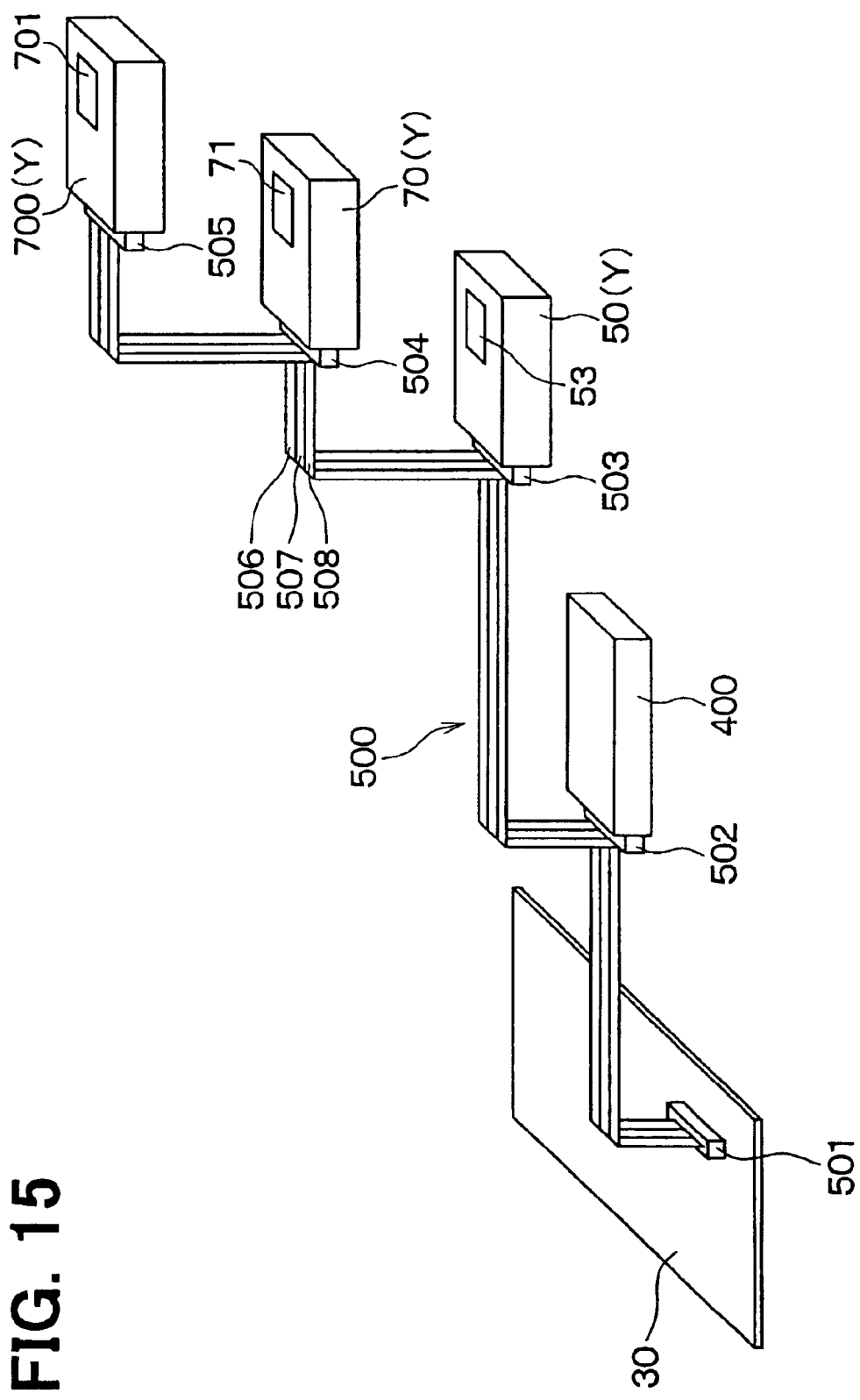
FIG. 15 is a drawing showing the constitution of a wiring harness in FIG. 13.

FIGS. 13 to 15 show a sixth embodiment. While the electrodes 80 are provided on the top wall surface 114 of the top case 11 as a power supply means for supplying the units Y with electric power in the first embodiment, wires and connectors are used for supplying power in place of the electrodes 80 in the present embodiment.

In FIG. 13, which shows an electric circuit of the blower apparatus, a motor 22 in the present embodiment is a brushless motor. The fan control circuit 30 (serving as fan control means) for controlling the operation of the motor 22 includes a drive logic circuit 32 and a drive circuit 33. The drive logic circuit 32 sets the start/stop and a target rotation speed of the motor 22 based on various types of signals, and provides a rotation speed instruction signal. The drive circuit 33 rotates the motor 22 at the instructed rotational speed based on the rotational speed instruction signal from the drive logic circuit 32.

The fan control circuit 30 includes a first wire 34 and a second wire 35 for supplying electrical power from a positive (+) side of a power supply 200 through a switch circuit 300. These wires 34 and 35 are connected with the drive circuit 33 through one wire 36. In addition, the fan control circuit 30 includes a wire 37 connected with a ground. The wire 36 on the positive (+) side, and the wire 37 on the ground side constitute motor power supply wires.

The drive logic circuit 32 detects voltages at points C and D on the first and second wires 34 and 35, and simultaneously, receives a smoke density signal from a smoke sensor 400 which provides the smoke density signal corresponding to smoke density in the cabin air.

The switch circuit 300 operates based on signals from a setting switch (not shown) set by an occupant for setting the airflow quantity and an automatic operation of the blower apparatus. The voltages at the points C and D change as follows according to the operational states of the switch circuit 300. Namely, when the setting switch is operated to select stopping the blower apparatus, the points C and D are at 0 V (LOW). When LO is selected as the airflow quantity, a LO contact 301 is closed, and only the point C becomes 12 V (HI). When HI is selected as the airflow quantity, a HI contact 302 is closed, and only the point D becomes 12 V (HI). When the automatic operation is selected, a contact 303 for automatic operation is closed, and both the points C and D become 12 V (HI).

The drive logic circuit 32 determines the operation of the motor 22 based on the individual voltages at the points C and D, and the smoke density signal from the smoke sensor 400, thereby providing the drive circuit 33 with the rotational speed instruction signal. Specifically, as shown in FIG. 14, when the occupant operates the setting switch to select any one of the stop, the airflow quantity LO, and the airflow quantity HI for the blower apparatus, the drive logic circuit 32 determines the operation of the motor 22 based on the individual voltages at the points C and D regardless of the output from the smoke sensor 400. On the other hand, when the occupant selects the automatic operation, the drive logic circuit 32 determines the operation of the motor 22 based on the output from the smoke sensor 400.

Consequently, the drive logic circuit 32 provides the drive circuit 33 with the rotation speed instruction signal, and then, the drive circuit 33 provides the motor 22 with a pulse signal corresponding to the rotation speed instruction signal, thereby driving the motor 22 to rotate at the instructed rotation speed.

The smoke sensor 400, the ion generator 50, the aroma generator 70, and a light source for a photocatalyst 700 (detailed later) are electrically connected with the fan control circuit 30 with a wiring harness 500 shown in FIG. 15. The aroma generator 70 according to the present embodiment includes an aroma generating part (not shown) for electrically generating aroma, and a unit control circuit 71 (serving as unit control means) for controlling the operation of the aroma generating part.

The light source for a photocatalyst 700 is used along with the deodorizing filter 60 which uses a catalyst to deodorize the air, and stores a lamp (not shown) for generating ultraviolet rays to activate the catalyst in the deodorizing filter 60, and a unit control circuit 701 (serving as unit control means) for controlling the operation of the lamp.

The wiring harness 500 includes five connectors 501 to 505 connected through first to third wires 506 to 508. When the first connector 501 is connected with the fan control circuit 30, the first wire 506 is connected with the wire 36 on the positive (+) side, the second wire 507 is connected with the wire 37 on the ground side, and the third wire 508 is connected with an input part for receiving the smoke density signal in the drive logic circuit 32. The first wire 506 and the second wire 507 constitute the unit power supply wires.

The second to fifth connectors 502 to 505 are respectively connected to the smoke sensor 400, the ion generator 50, the aroma generator 70, and the light source for a photocatalyst 700, thereby forming a daisy chain connection. Since the third wire 508 is used for transmitting the smoke density signal, it is necessary to provide the third wire 508 only between the connector connected with the smoke sensor 400, and the first connector 501. However, the second to fifth connectors 502 to 505 have the same shape and the same terminal arrangement for avoiding a connection error, and for allowing connecting any one of the first to fifth connectors 502 to 505 to any one of the units Y.

When the setting switch is operated to select a state other than the stopped state of the blower apparatus, any one of the LO contact 301, the HI contact 302, and the automatic operation contact 303 in the switch circuit 300 closes. As a result, since the positive (+) side of the power supply 200 supplies the wire 36 of the fan control circuit 30 with electric power, the electric power is supplied for the smoke sensor 400, the ion generator 50, the aroma generator 70, and the light source for a photocatalyst 700 through the first wire 506 and the second wire 507, thereby operating them in a predetermined way.

The smoke sensor 400 is provided in the outside space of the nose portion 111, which is a start point of the scroll portion 110 (see FIG. 1). The ion generator 50, the aroma generator 70, and the light source for a photocatalyst 700 are provided in the airflow passages 14a and 14b (see FIG. 1 and FIG. 2). The ion generator 50, the aroma generator 70, and the light source for a photocatalyst 700 have a shape and a size compatible with those of the dust filter 40 and the deodorizing filter 60 shown in FIG. 1 and FIG. 2. Thus, when a user wants to change the functions of the blower apparatus, these units can be replaced with other units.

Each of the dust filter 40 and the deodorizing filter 60 is explained as a non-electric powered air treatment component. Each of the ion generator 50, the aroma generator 70 and the photo-catalyst activating light source 700 is explained as an electric powered air treatment component. The non-electric powered air treatment component and the electric powered air treatment component are designed to be replaceable with each other. Similarly, the electric powered air treatment components are designed to be replaceable with each other. For example, the ion generator 50 is replaceable with the aroma generator 70 or the photo-catalyst activating light source 700.

While three wires 506 to 508 are used for the wiring harness 500 of the present embodiment, there may be added a fourth wire which is to be connected with the positive (+) side of the power supply 200 when an ignition switch (not shown) of the vehicle is at an on-position. In addition, if the light source for a photocatalyst 700 is connected with the fourth wire instead of the first wire 506 when the light source for a photocatalyst 700 is connected with the connector, the light source for a photocatalyst 700 operates when the ignition switch is turned on even if the setting switches are operated to select the stopped state of the blower apparatus.

(Seventh Embodiment)

Figure 16:
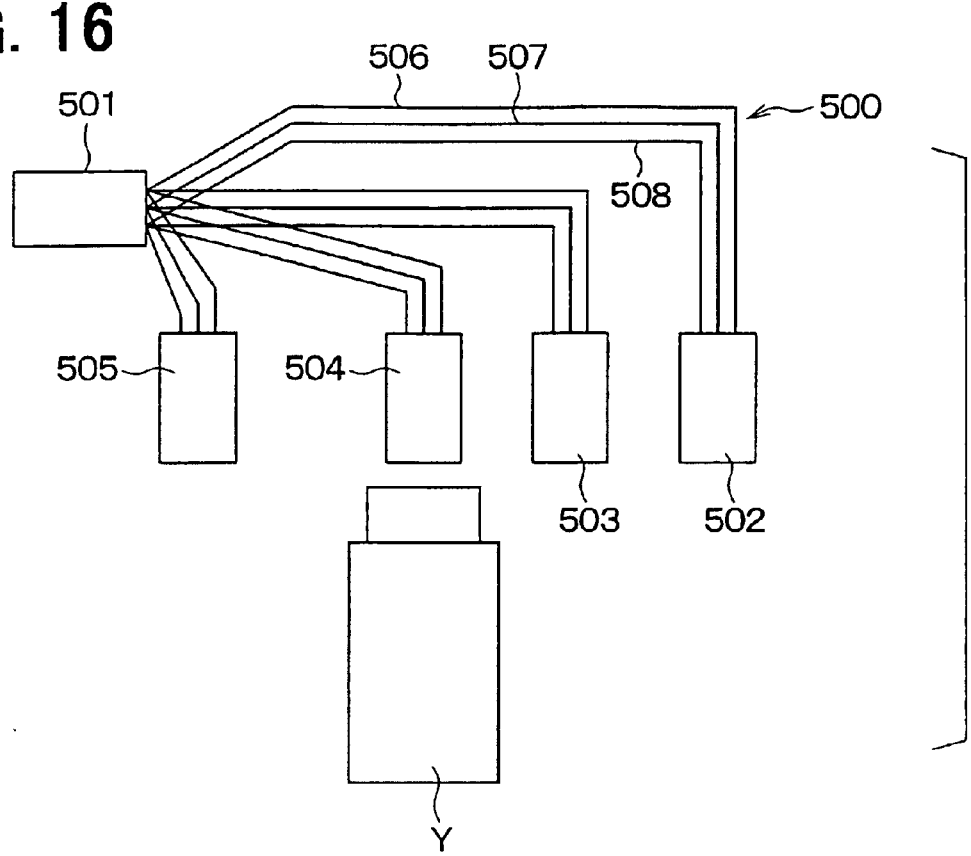
FIG. 16 is a drawing showing a wiring harness according to a seventh embodiment of the present invention.

In a seventh embodiment as shown in FIG. 16, the structure of the harness 500 in the sixth embodiment is changed. Namely, the first wire 506 to the third wire 508 each branches into four wires. This creates four parallel wire sets from the first connector 501, so that one set can be connected to the second connector 502, one to the third connector 503, one to the fourth connector 504, and one to the fifth connector 505. Again each set is electrically in parallel.

(Eighth Embodiment)

Figure 17:
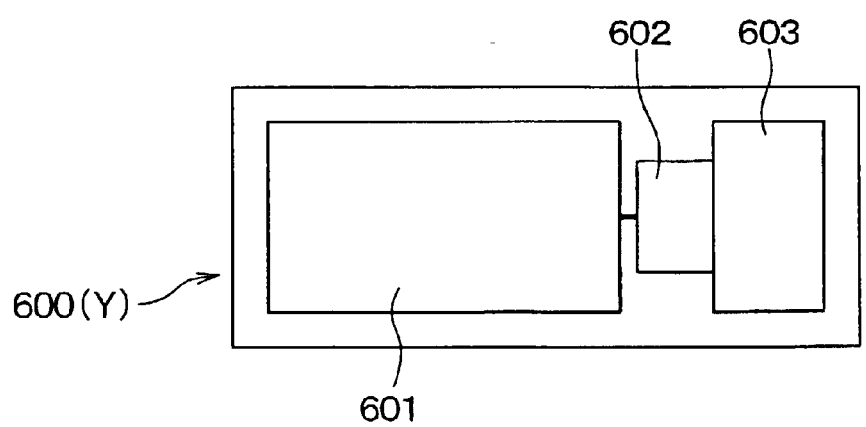
FIG. 17 is a schematic view of a unit showing an eighth embodiment of the present invention.

As the unit Y installed in the airflow passages 14a and 14b (see FIG. 1 and FIG. 2), a humidifier 600 is used as the component-adding unit in an eighth embodiment shown in FIG. 17. The humidifier 600 includes a water tank 601, an ultrasonic actuator 602 for vaporizing the water, and a drive circuit 603 (serving as unit control means) for controlling the operation of the actuator 602. Any one of the second connector 502 to the fifth connector 505 (see FIG. 15 and FIG. 16) is connected with the humidifier 600, thereby supplying the humidifier 600 with electric power.

(Other Embodiments)

In the embodiments above, the air is blown out in one or two directions. However, the air may be blown out in three or more directions. Also, a solar battery, for example, in addition to the vehicle power supply 200 may be used as a power supply for the motor 22, the fan control circuit 30, and the units Y, thereby making it possible to supply electric power from the solar battery for operating the blower apparatus when the vehicle is stopping or stopped.

As the unit Y, in addition to the air cleaning unit for cleaning the air, and the component-adding unit for adding an air component to the air, a unit such as an illumination lamp and a speaker may be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A blower apparatus for a vehicle having a cabin, the blower apparatus comprising:
    a case which forms an airflow passage therein;
    a blower which blows air into cabin through the airflow passage;
    an air cleaning unit for cleaning the air blowing through the air flow passage, the air cleaning unit being capable of being disposed in the air flow passage;
    a component-adding unit for adding an air component to the air blowing through the air flow passage, the component-adding unit being capable of being disposed in the air flow passage, wherein
    outer shapes of the air cleaning unit and the component-adding are essentially the same,
    structures of the air cleaning unit and the component-adding unit with respect to mounting them into the air flow passage are essentially the same,
    a first installation compartment, where the air cleaning unit is to be installed, and a second installation compartment, where the component-adding unit is to be installed, are provided in the air flow passage,
    the air cleaning unit is attachable to the first installation compartment and detachable therefrom,
    the component-adding unit is attachable to the second installation compartment and detachable therefrom,
    the air cleaning unit is attachable to the second installation compartment and detachable therefrom, and
    the component-adding unit is attachable to the first installation compartment and detachable therefrom.

2. The blower apparatus for a vehicle according to claim 1, wherein
    said blower apparatus is provided with a blower apparatus control means for controlling operation of the blower apparatus.

3. The blower apparatus for a vehicle according to claim 1 further comprising fan control means, and a unit power supply wire, wherein
    said blower includes a fan and a motor for driving the fan, said fan control means controls power to the motor, and said unit power supply wire branches from said fan control means for supplying one of said units with electricity.

4. The blower apparatus for a vehicle according to claim 3 further comprising a plurality of connectors attached to and detached from said one unit, and connected with said unit power supply wire, wherein
    said plurality of connectors have an identical connector shape and an identical terminal arrangement.

5. A blower apparatus for a vehicle having a battery and a cabin, the blower apparatus comprising:
    a case which forms an airflow passage therein;
    a blower which has a motor for driving a fan for blowing air into the cabin through the airflow passage;
    an electricity supplying means which supplies electricity from the battery; and
    two types of unit which have different functions and can be installed at approximately the same installation compartment in said airflow passage, wherein electricity is supplied to one of the units from the electricity supplying means; and
    the fan control means controls the fan by controlling electricity supplied to the motor on the basis of a signal from a switch for controlling the blower,
    the fan control means controls the electricity supplied to the one unit,
    the one unit and the electricity supplying means are electrically connected to each other while installed in the case,
    outer shapes of each of the units is essentially the same,
    structure of each of the units for mounting them to the air flow passage is essentially the same,
    the air flow passage has installation compartments in which the units are to be installed,
    each of the units is attachable to a respective installation compartment and detachable from the respective installation compartment, and
    the one unit is attachable to the installation compartment for the other unit and detachable from the installation compartment for the other unit.

6. The blower apparatus for a vehicle according to claim 5, wherein
    said electricity supplying means is composed of power supply electrodes fixed on an inner wall surface of said case,
    said one unit is provided with electrodes to be connected with said power supply electrodes, and
    said electrodes of said one unit and said power supply electrodes are electrically connected with each other by installing said one unit in said case.

7. The blower apparatus for a vehicle according to claim 6, wherein
    said power supply electrodes have a plate shape, and are provided along the inner wall surface of said case member.

8. The blower apparatus for a vehicle according to claim 5, wherein
    said one unit is provided with unit control means for controlling operation of the unit.

9. The blower apparatus for a vehicle according to claim 5 further comprising a scroll portion formed in said case, wherein said fan is provided in said scroll portion, and said fan control means is provided in an outside space of a nose portion of said scroll portion.

10. A blower apparatus for a vehicle, the blower apparatus comprising:

a case which forms an airflow passage therein;

a blower which blows air through said airflow passage and into said vehicle;

a first installation compartment disposed within said airflow passage of said case;

a second installation compartment disposed within said airflow passage of said case;

a first unit having a first function, said first unit being disposed in either said first installation compartment or said second installation compartment;

a second unit having a second function different than said first function, said second unit being disposed in either said first installation compartment or said second installation compartment but not the same installation compartment as said first unit;

wherein said first unit engages an electrical connector in both said first and said second installation compartments.

* * * * *